United States Patent
Ahn et al.

(10) Patent No.: US 10,383,007 B2
(45) Date of Patent: Aug. 13, 2019

(54) COMMUNICATION METHOD IN UNLICENSED BAND AND APPARATUS UTILIZING THE METHOD

(71) Applicant: LG ELECTRONICS INC., Seoul (KR)

(72) Inventors: Joonkui Ahn, Seoul (KR); Byounghoon Kim, Seoul (KR); Suckchel Yang, Seoul (KR); Jonghyun Park, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 7 days.

(21) Appl. No.: 15/508,826

(22) PCT Filed: Sep. 4, 2015

(86) PCT No.: PCT/KR2015/009336
§ 371 (c)(1),
(2) Date: Mar. 3, 2017

(87) PCT Pub. No.: WO2016/036181
PCT Pub. Date: Mar. 10, 2016

(65) Prior Publication Data
US 2017/0289853 A1    Oct. 5, 2017

Related U.S. Application Data

(60) Provisional application No. 62/056,624, filed on Sep. 29, 2014, provisional application No. 62/047,460, (Continued)

(51) Int. Cl.
*H04W 4/00* (2018.01)
*H04W 28/26* (2009.01)
(Continued)

(52) U.S. Cl.
CPC ....... *H04W 28/26* (2013.01); *H04W 72/0473* (2013.01); *H04W 74/02* (2013.01);
(Continued)

(58) Field of Classification Search
None
See application file for complete search history.

(56) References Cited

U.S. PATENT DOCUMENTS

2011/0310747 A1* 12/2011 Seo .............. H04B 7/2606
                                                   370/246
2016/0057770 A1*  2/2016 Yerramalli ...... H04B 7/0811
                                                   370/329

FOREIGN PATENT DOCUMENTS

| WO | 2010/093205 | 8/2010 |
| WO | 2013/119095 | 8/2013 |
| WO | 2013/179095 | 12/2013 |

OTHER PUBLICATIONS

PCT International Application No. PCT/KR2015/009336, International Search Report dated Dec. 17, 2015, 4 pages.
(Continued)

*Primary Examiner* — Zewdu A Beyen
(74) *Attorney, Agent, or Firm* — Lee, Hong, Degerman, Kang & Waimey (57) ABSTRACT

Provided are a communication method and an apparatus utilizing the same in a wireless communication system. The apparatus configures a resource reservation period (RRP), the period during which channel access by the apparatus permitted in an unlicensed band is not permitted. When the permission conditions are met, the apparatus accesses the channel during the RRP.

10 Claims, 11 Drawing Sheets

Related U.S. Application Data filed on Sep. 8, 2014, provisional application No. 62/046,185, filed on Sep. 5, 2014.

(51) Int. Cl.
  *H04W 74/02* (2009.01)
  *H04W 76/10* (2018.01)
  *H04W 72/04* (2009.01)
  *H04W 88/02* (2009.01)
  *H04W 88/08* (2009.01)
  *H04W 74/08* (2009.01)
  *H04W 16/14* (2009.01)

(52) U.S. Cl.
  CPC ............ *H04W 76/10* (2018.02); *H04W 16/14* (2013.01); *H04W 74/0808* (2013.01); *H04W 88/02* (2013.01); *H04W 88/08* (2013.01)

(56) References Cited

OTHER PUBLICATIONS

Sari Nielsen, et al., Nokia Corporation, 3GPP, "LTE in Unlicensed Spectrum: European Regulation and Co-existence Consideration," RWS-140002, Jun. 13, 2014, 13 pgs.

Lorenzo Casaccia, Senior Director, Technical Standards, QUALCOMM, 3GPP, "Extending the benefits of LTE to unlicensed spectrum," RWS-140008, Jun. 4, 2014, 21 pgs.

Sofia Antipolis, Samsung, EGPP TSG-RAN Workshop on LTE-U, "Performance Evaluation of LTE in Unlicensed Spectrum," RWS-140016, Jun. 13, 2014, 11 pgs.

* cited by examiner

COMMUNICATION METHOD IN UNLICENSED BAND AND APPARATUS UTILIZING THE METHOD

CROSS-REFERENCE TO RELATED APPLICATIONS

This application is the National Stage filing under 35 U.S.C. 371 of International Application No. PCT/KR2015/009336, filed on Sep. 4, 2015, which claims the benefit of U.S. Provisional Application No. 62/046,185, filed on Sep. 5, 2014, 62/047,460, filed on Sep. 8, 2014, and 62/056,624, filed on Sep. 29, 2014, the contents of which are all hereby incorporated by reference herein in their entirety.

BACKGROUND OF THE INVENTION

Field of the Invention

The present invention relates to wireless communication, and more particularly, to a communication method in an unlicensed band in a wireless communication system, and an apparatus using the method.

Related Art

With the explosive increase in mobile data traffic in recent years, a service provider has utilized a wireless local area network (WLAN) to distribute the data traffic. Since the WLAN uses an unlicensed band, the service provider can address a demand for a significant amount of data without the cost of an additional frequency. However, there is a problem in that an interference phenomenon becomes serious due to a competitive WLAN installation between the providers, quality of service (QoS) cannot be guaranteed when there are many users, and mobility cannot be supported. As one of methods for compensating this, a long term evolution (LTE) service in the unlicensed band is emerged.

LTE in unlicensed spectrum (LTE-U) or licensed-assisted access using LTE (LAA) is a technique in which an LTE licensed band is used as an anchor to combine a licensed band and an unlicensed band by the use of carrier aggregation (CA). A user equipment (UE) first accesses a network in the licensed band. A base station (BS) may offload traffic of the licensed band to the unlicensed band by combining the licensed band and the unlicensed band according to a situation.

The LTE-U may extend an advantage of LTE to the unlicensed band to provide improved mobility, security, and communication quality, and may increase a throughput since the LTE has higher frequency efficiency than the legacy radio access technique.

Unlike the licensed band in which exclusive utilization is guaranteed, the unlicensed band is shared with various radio access techniques such as the WLAN. Therefore, each communication node acquires a channel to be used in the unlicensed band in a contention-based manner, and this is called a carrier sense multiple access with collision avoidance (CSMA/CA). Each communication node must perform channel sensing before transmitting a signal to confirm whether a channel is idle, and this is called clear channel assessment (CCA).

Since various wireless access techniques perform the CCA in the unlicensed band, there is a need for a method capable of reducing an interference.

SUMMARY OF THE INVENTION

The present invention provides a communication method in an unlicensed band, and an apparatus using the method.

In an aspect, a method for communicating in a wireless communication system includes setting, by a wireless device, up a resource reservation period (RRP) which is a period during which a channel access by the wireless device is not permitted in an unlicensed band, and, if a permission condition is satisfied, performing, by the wireless device, the channel access during the RRP.

The permission condition may comprise a condition in which a transmit power required for transmission of the wireless device is less than or equal to a first threshold.

The permission condition may comprise a condition in which a receive power of the wireless device is less than or equal to a second threshold.

The permission condition may comprise a condition in which a strength of a signal received by the wireless device from a neighboring node is less than or equal to a third threshold.

A clear channel assessment (CCA) threshold during the RRP in the unlicensed band may be different from a CCA threshold during a non-RRP.

In another aspect, an apparatus in a wireless communication system includes a transceiver configured to transmit and receive a radio signal, and a processor operatively coupled to the transceiver. The processor is configured to set up a resource reservation period (RRP) which is a period during which a channel access by the apparatus is not permitted in an unlicensed band and, if a permission condition is satisfied, perform the channel access through the transceiver during the RRP.

An interference can be reduced in an environment where various communication protocols coexist in an unlicensed band.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. The wireless device may also be a device supporting only data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

Hereinafter, it is described that the present invention is applied according to a $3^{rd}$ generation partnership project (3GPP) long term evolution (LTE) based on 3GPP technical specification (TS). However, this is for exemplary purposes only, and thus the present invention is also applicable to various wireless communication networks.

In a carrier aggregation (CA) environment or a dual connectivity environment, the wireless device may be served by a plurality of serving cells. Each serving cell may be defined with a downlink (DL) component carrier (CC) or a pair of a DL CC and an uplink (UL) CC.

The serving cell may be classified into a primary cell and a secondary cell. The primary cell operates at a primary frequency, and is a cell designated as the primary cell when an initial network entry process is performed or when a network re-entry process starts or in a handover process. The primary cell is also called a reference cell. The secondary cell operates at a secondary frequency. The secondary cell may be configured after an RRC connection is established, and may be used to provide an additional radio resource. At least one primary cell is configured always. The secondary cell may be added/modified/released by using higher-layer signaling (e.g., a radio resource control (RRC) message).

A cell index (CI) of the primary cell may be fixed. For example, a lowest CI may be designated as a CI of the primary cell. It is assumed hereinafter that the CI of the primary cell is 0 and a CI of the secondary cell is allocated sequentially starting from 1.

Figure 1:
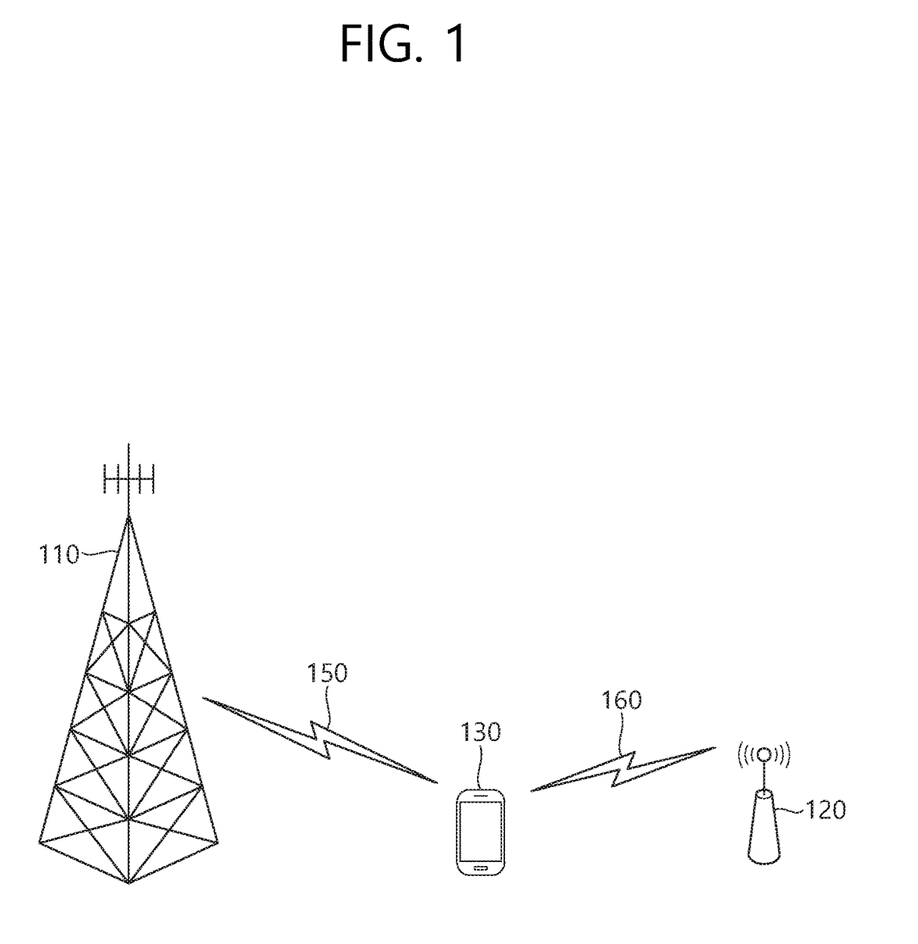
FIG. 1 shows an example of a long term evolution (LTE) service using an unlicensed band.

FIG. 1 shows an example of an LTE service using an unlicensed band.

A wireless device 130 establishes a connection with a $1^{st}$ BS 110, and receives a service through a licensed band. For UL traffic offloading, the wireless device 130 may receive a service through an unlicensed band with respect to a $2^{nd}$ BS 120.

The $1^{st}$ BS 110 is a BS supporting an LTE system, whereas the $2^{nd}$ BS 120 may also support other communication protocols such as a wireless local area network (WLAN) in addition to LTE. The $1^{st}$ BS 110 and the $2^{nd}$ BS 120 may be associated with a carrier aggregation (CA) environment, and a specific cell of the $1^{st}$ BS 110 may be a primary cell. Alternatively, the $1^{st}$ BS 110 and the $2^{nd}$ BS 120 may be associated with a dual connectivity environment, and a specific cell of the $1^{st}$ BS 110 may be a primary cell. In general, the $1^{st}$ BS 110 having the primary cell has wider coverage than the $2^{nd}$ BS 120. The $1^{st}$ BS 110 may be called a macro cell. The $2^{nd}$ BS 120 may be called a small cell, a femto cell, or a micro cell. The $1^{st}$ BS 110 may operate the primary cell and zero or more secondary cells. The $2^{nd}$ BS 120 may operate one or more secondary cells. The secondary cell may be activated/deactivated by an indication of the primary cell.

The above description is for exemplary purposes only. The $1^{st}$ BS 110 may correspond to the primary cell, and the $2^{nd}$ BS 120 may correspond to the secondary cell, so that the cell can be managed by one BS.

The licensed band is a band in which an exclusive use is guaranteed to a specific communication protocol or a specific provider.

The unlicensed band is a band in which various communication protocols coexist and a shared use is guaranteed. The unlicensed band may include 2.5 GHz and/or 5 GHz band used in a WLAN.

It is assumed in the unlicensed band that a channel is occupied basically through contention between respective communication nodes. Therefore, in communication in the unlicensed band, it is required to confirm that signal transmission is not achieved by other communication nodes by performing channel sensing. For convenience, this is called a listen before talk (LBT), and if it is determined that signal transmission is not achieved by other communication nodes, this case is defined as confirmation of clear channel assessment (CCA).

The LBT must be performed preferentially in order for a BS or wireless device of an LTE system to have access to a channel in the unlicensed band. Further, when the BS or wireless device of the LTE system transmits a signal, an interference problem may occur since other communication nodes such as the WLAN or the like also perform the LBT. For example, in the WLAN, a CCA threshold is defined as −62 dBm as to a non-WLAN signal and is defined as −82 dBm as to a WLAN signal. This means that interference may occur in an LTE signal due to other WLAN devices when the LTE signal is received with power less than or equal to −62 dBm.

Hereinafter, when it is said that 'LBT is performed' or 'CCA is performed', it implies that whether a channel is idle or is used by another node is confirmed first and thereafter the channel is accessed.

Hereinafter, the LTE and the WLAN are described for example as a communication protocol used in the unlicensed band. This is for exemplary purposes only, and thus it may also be said that a $1^{st}$ communication protocol and a $2^{nd}$ communication protocol are used in the unlicensed band. A BS supports the LTE. A UE is a device supporting the LTE.

Hereinafter, although it is described that downlink (DL) transmission is based on transmission performed by a BS and uplink (UL) transmission is based on transmission performed by a UE, the DL transmission and the UL transmission may also be performed by a transmission node or node group in a wireless network. The UE may imply an individual node which exists for each user, and the BS may imply a central node for transmitting/receiving and controlling data for a plurality of individual nodes. From this perspective, the term 'BS' may be replaced with a DL node, and the term 'UE' may be replaced with a UL node.

Figure 2:
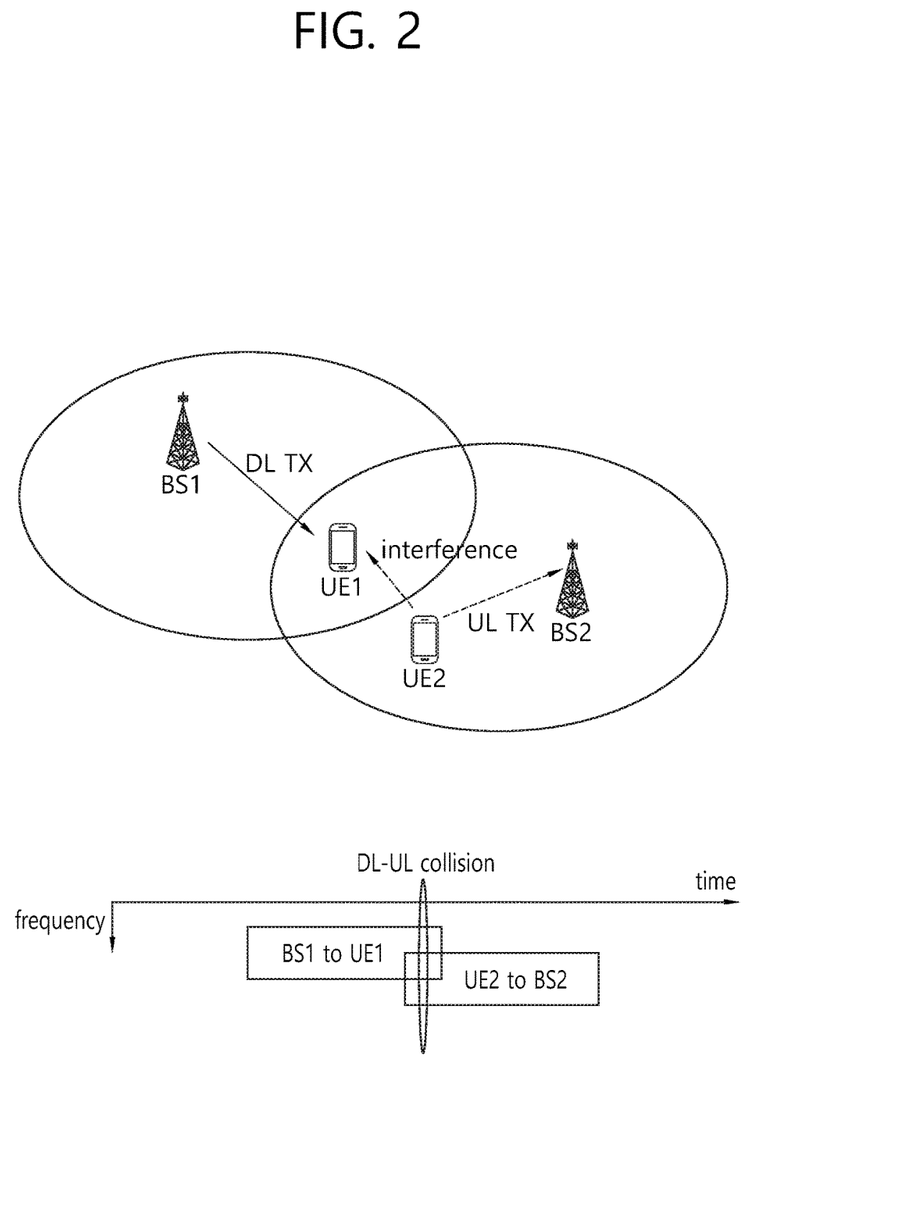
FIG. 2 shows an example of interference in an unlicensed band.

FIG. 2 shows an example of interference in an unlicensed band.

A UE1 is operating in a first unlicensed band by accessing a BS1, and a UE2 is operating in a second unlicensed band by accessing a BS2. It shows that interference occurs due to transmission of different nodes (e.g., UE or BS), when the first and second unlicensed bands overlap partially or entirely.

The BS1 starts DL transmission to the UE1. Since the UE2 is located out of the coverage of the BS1, the UE2 may not be able to detect the DL transmission but be able to start UL transmission. If the UE1 and the UE2 are close to each other, UL transmission of the UE2 may act as interference to UL reception, and may deteriorate reception performance of the UE1.

Hereinafter, methods are proposed for avoiding communication performance deterioration caused by signal interference in an unlicensed band.

In Case of Assuming Time Synchronization Between Communication Nodes

In an unlicensed band, transmission of a communication node may be achieved not persistently but intermittently due to fairness of radio access with respect to other systems which exist in the same band. A duration in which the communication node performs transmission in the unlicensed band is referred to as a resource reservation period (RRP).

Figure 3:
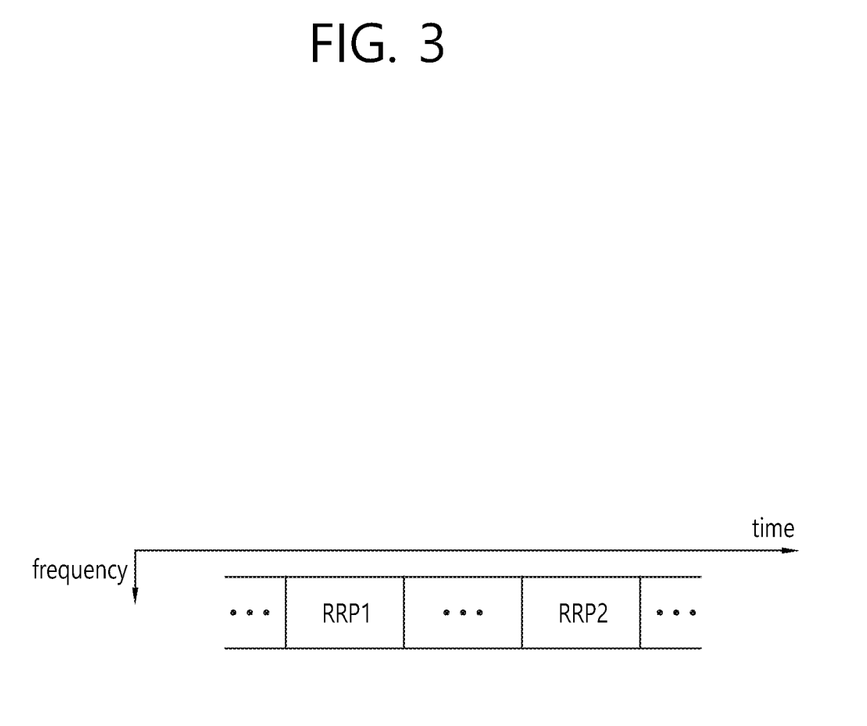
FIG. 3 shows an example of configuring a resource reservation period (RRP).

FIG. 3 shows an example of configuring an RRP.

The RRP may be defined based on DL transmission timing of a cell operating in a licensed band or DL reception timing of a UE. The RRP may be given in unit of a subframe or in unit of a radio frame. The RRP may be configured periodically or aperiodically. A BS may provide the UE with information regarding the configuration of the RRP. The RRP configuration may include information regarding an offset, period, and/or magnitude of the RRP. When time synchronization is achieved between neighboring cells and the same RRP configuration is applied, DL-UL interference may be decreased. For this, information regarding the RRP configuration may be shared between BSs.

A node in which transmission is permitted for the RRP is called an XL node or a permitted node. A node in which transmission is not permitted for the RRP is called a YL node or an unpermitted node. If the permitted node corresponds to only the BS during the RRP, the RRP is a DL duration. If the permitted node corresponds to only the BS during the RRP, the RRP is a UL duration. If the permitted node corresponds to the BS and the UE during the RRP, the RRP is both UL and DL durations.

A network may designate the permitted node or the unpermitted node with respect to the RRP.

Only the permitted node may be permitted to access a radio channel during the RRP duration. Only the permitted node may perform CCA during the RRP, and may perform DL transmission or UL transmission.

However, the unpermitted node for which an access is not permitted during the RRP may have access to a channel during the RRP if at least one of the following permission conditions is satisfied.

First, transmission may be permitted if transmit power required for transmission of a corresponding signal of the unpermitted node is less than or equal to a specific threshold. The threshold may be reported by the BS to the UE or may be shared between the BSs. In doing so, interference to another permitted node may be reduced when the unpermitted node transmits a signal with excessively great transmit power.

Second, transmission may be permitted if the unpermitted node is a receiver of the permitted node, and if a path loss between the unpermitted node and the permitted node or receive power (e.g., reference signal received power (RSRP)) is less than or equal to a specific threshold. The threshold may be reported by the BS to the UE or may be shared between the BSs.

Third, transmission may be permitted if an average interference power amount received by the unpermitted node or strength of a signal received by the unpermitted node from a neighboring permitted node is less than or equal to a specific threshold. In doing so, interference may be avoid by distinguishing a case where there is a high possibility that another unpermitted node adjacent to the unpermitted node is present or reception of the permitted node is interfered. The threshold may be reported by the BS to the UE or may be shared between the BSs.

Fourth, from a perspective of the communication node, a CCA threshold (i.e., a first threshold) in an RRP in which the node is a permitted node (this is called a permitted RRP) may be different from a CCA threshold (e.g., a second threshold) in an RRP in which the node is an unpermitted node (this is called an unpermitted RRP). The second threshold may be higher than the first threshold. The first and second thresholds may be reported by the BS to the UE or may be shared between the BSs. The communication node may not perform CCA in the permitted node (e.g., the first threshold=0), and may perform CCA in the unpermitted RRP. Interference may be reduced by decreasing a possibility of transmission performed by the unpermitted node in the RRP.

Figure 4:
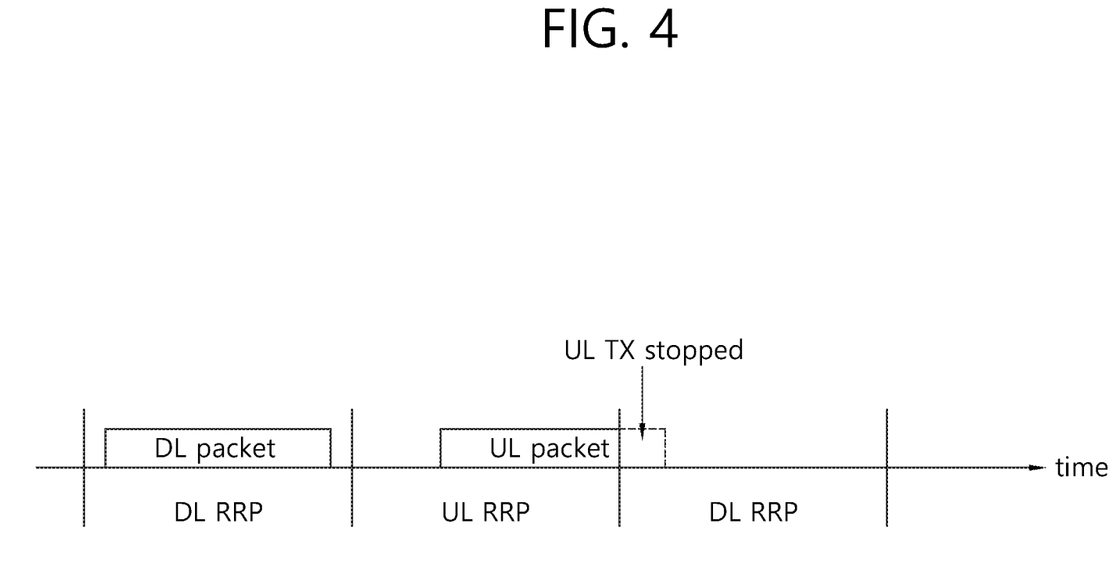
FIG. 4 shows an example of packet transmission during an RRP.

FIG. 4 shows an example of packet transmission during an RRP.

It is assumed that transmission is permitted for a BS in a DL RRP, and transmission is permitted for a UE in a UL RRP. A packet to be transmitted may be out of an RRP duration because of transmission timing, a packet size, or the like. For example, if a UL packet is out of the UL RRP or overlaps with the DL RRP, the UE may discard transmission of the UL packet in a corresponding duration. Similarly, if a DL packet is out of the DL RRP or overlaps with the UL RRP, the BS may discard transmission of the DL packet in a corresponding duration.

One RRP may be configured to one of DL transmission and UL transmission. Alternatively, a DL transmission duration and/or a UL transmission duration may be configured in one RRP.

Figure 5:
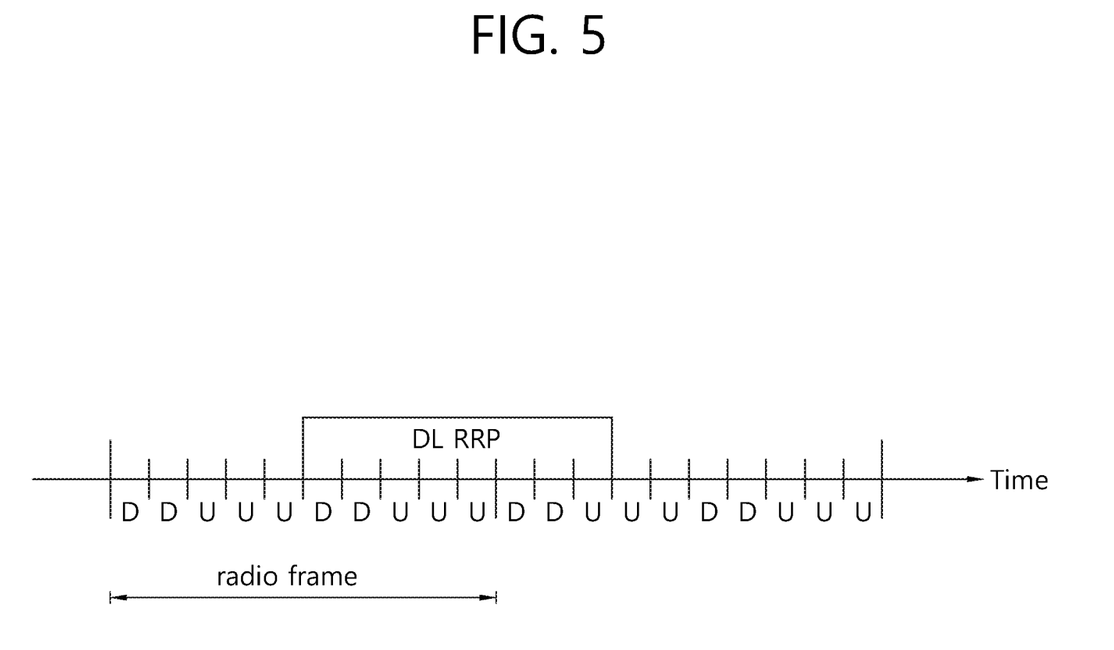
FIG. 5 shows an example of configuring a downlink (DL) transmission duration and an uplink (UL) transmission duration within an RRP.

FIG. 5 shows an example of configuring a DL transmission duration and a UL transmission duration within an RRP.

In 3GPP LTE time division duplex (TDD), one radio frame includes 10 subframes, and a DL subframe or a UL subframe is defined for each subframe according to a UL-DL configuration. In the figure, 'D' denotes a DL subframe, and 'U' denotes a UL subframe.

The UL-DL configuration may be predetermined also in an unlicensed band, and an RRP including a plurality of subframes may be defined. A DL operation or a UL operation may be performed in a subframe in the RRP according to the UL-DL configuration. For example, if a DL RRP in which only DL transmission is possible is configured, a BS may perform DL transmission in a DL subframe among subframes in the DL RRP.

In particular, an interference problem caused by collision of DL-UL transmission may have a serious effect on a reference signal or broadcast signal transmitted by the BS. Therefore, an RRP for DL transmission of the BS may be defined for a duration in which the reference signal or the broadcast signal is transmitted. For example, the DL RRP may be defined for discovery reference signal (DRS) transmission for DL synchronization, and UL transmission by the UE may be prohibited during the DL RRP. In addition, a periodic RRP may be defined in an unlicensed band, and the BS may transmit the reference signal or the broadcast signal during the RRP. In UL transmission, the RRP may also be applied only to a specific UL signal.

In Case of not Assuming Time Synchronization Between Communication Nodes

If time synchronization cannot be assumed between communication nodes, it is not easy to designate DL/UL transmission to a predetermined time duration. If the communication nodes perform LBT, a muting signal may be transmitted to adjacent different transmission nodes before a reception node starts signal reception, thereby preventing other transmission nodes from starting transmission.

Figure 6:
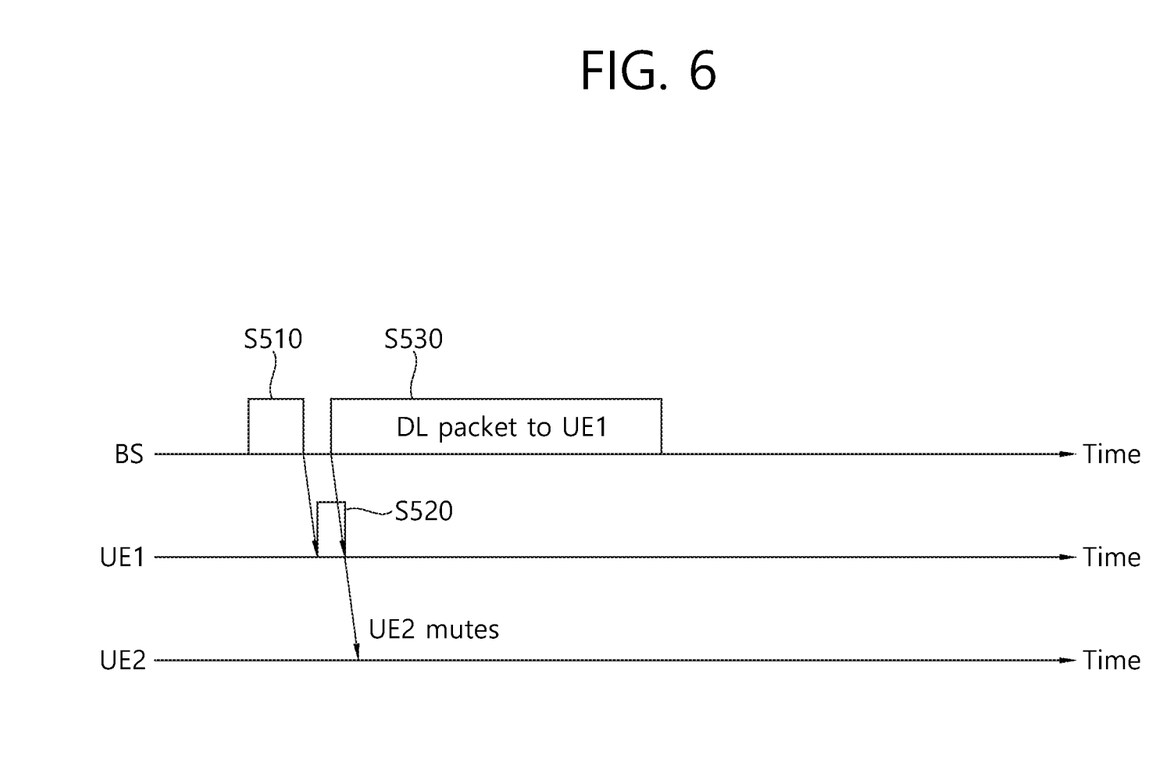
FIG. 6 shows a communication method according to an embodiment of the present invention.

FIG. 6 shows a communication method according to an embodiment of the present invention. Although it is assumed that a transmitting node is a BS and a receiving node is a UE, the present embodiment may also be applied to a UL operation.

A UE1 receives a scheduling signal from a BS to report a presence of DL scheduling (S510).

The UE1 transmits a muting signal before starting to receive a data packet from the BS (S520). The muting signal may include information regarding a muting duration in which the UE1 will receive the data packet. Alternatively, the muting duration may be predetermined or may be reported in advance by the BS to the UE1. The muting duration may be determined according to a sequence of the muting signal or a time/frequency resource on which the muting signal is transmitted. The muting signal may be transmitted on one or more orthogonal frequency division multiplexing (OFDM) symbols.

The UE1 receives a DL packet from the BS during the muting duration (S530).

Upon receiving the muting signal, the UE2 does not perform UL transmission and/or DL reception during the muting duration. Alternatively, the UE may stop CCA during the muting duration.

Figure 7:
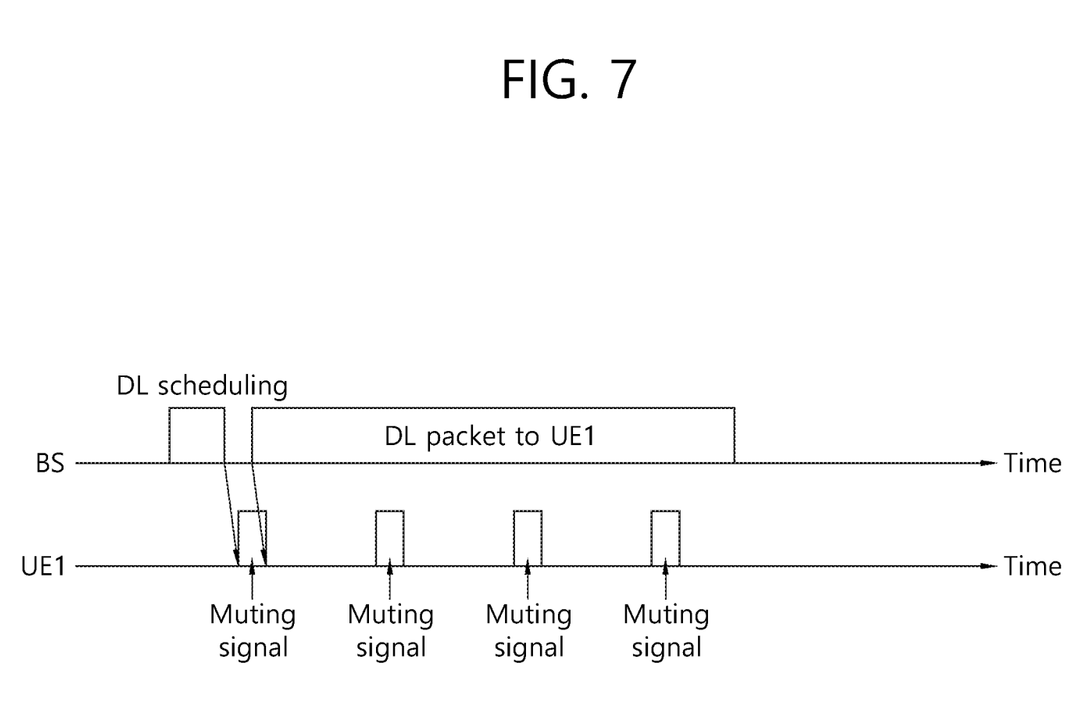
FIG. 7 shows a communication method according to another embodiment of the present invention.

FIG. 7 shows a communication method according to another embodiment of the present invention.

In comparison with the embodiment of FIG. 6, a UE1 may transmit a muting signal with a determined time interval while a data packet is received. If the muting duration is a time not enough to receive the data packet, the UE1 may retransmit the muting signal whenever the muting duration ends.

Band Separation

An unlicensed band may be divided into a plurality of subbands, and a communication node operating for each subband and/or an operation direction may be designated.

Figure 8:
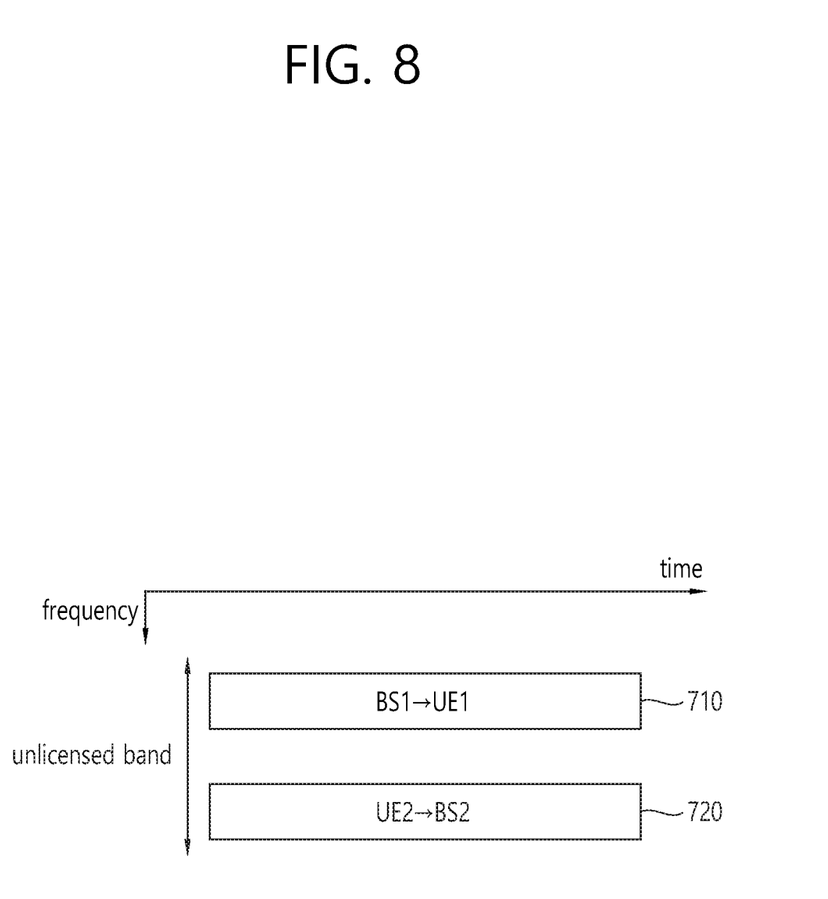
FIG. 8 shows a band separation according to an embodiment of the present invention.

FIG. 8 shows a band separation according to an embodiment of the present invention.

An unlicensed band includes at least one first subband 710 and at least one second subband 720. The first subband 710 may be used in transmission from a BS1 to a UE1, and the second subband 720 may be used in transmission from a UE2 to a BS2. An interference problem is solved by guaranteeing a separation between DL transmission from the BS1 to the UE1 and UL transmission from the UE2 to the BS2.

Alternatively, the first subband 710 may be used in DL transmission, and the second subband 720 may be used in UL transmission. All BSs may transmit a DL signal in the first subband 710, and all UEs may transmit a UL signal in the second subband 720. In this case, the first subband 710 is a DL subband, and the second subband 720 is a UL subband. The BS may simultaneously perform DL transmission in the DL subband and UL reception in the UL subband.

A guard band may be disposed between the first subband 710 and the second subband 720.

A subband within the unlicensed band may be divided into a plurality of DL (UL) carriers. The BS/UE may select and use any DL (UL) carrier, or may use a predetermined carrier.

The DL subband may be allocated to a relatively higher frequency band than the UL subband. When the unlicensed band includes a plurality of carriers, the DL subband may be allocated sequentially from a carrier having a highest center frequency. On the contrary, the UL subband may be allocated sequentially from a carrier having a lowest center frequency.

If the BSs are disposed with a proper distance, interference caused by DL transmission of different BSs for any UE may not have a serious effect on DL reception performance. In addition, in case of being separated into the DL/UL subband described above, since another UE's interference caused by DL transmission of the BS is significantly decreased, a CCA operation may not be performed in the DL subband. That is, if the DL subband and the UL subband are separated, the CCA operation may be performed only in the UL subband.

The DL/UL subband may be flexibly configured, instead of being fixedly determined. Information regarding a location of a subband and/or a bandwidth may be provided by the BS to the UE. When a subband is defined by a carrier, the BS may provide the UE with information regarding a location of a carrier corresponding to each subband and/or the number of carriers. The configuration information may be transmitted through a cell (e.g., a primary cell) operating in the licensed band.

If information regarding the DL subband is not acquired, the UE may perform DL reception through a carrier defined in the highest frequency band in the unlicensed band. Alternatively, a default DL carrier for the DL subband may be predetermined in the unlicensed band.

If information regarding the UL subband is not acquired, the UE may perform UL reception through a carrier defined in a lowest frequency band in the unlicensed band. Alternatively, a default UL carrier for the UL subband may be predetermined in the unlicensed band.

Each carrier in the DL subband may be paired with a corresponding carrier in the UL subband. Alternatively, a frequency interval for pairing may be provided by a network to the UE. When a carrier for the DL subband is known through DL signaling or the like, the UE may also know a carrier of the UL subband.

Figure 9:
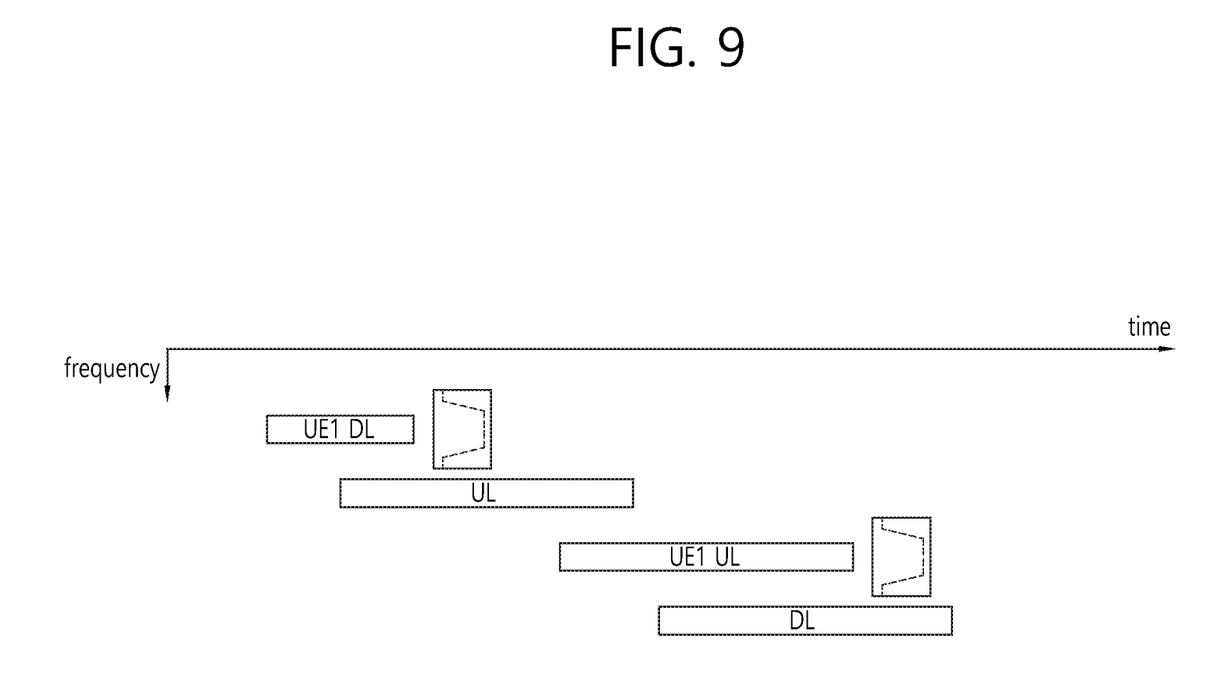
FIG. 9 shows an example of interference in a frequency band adjacent to an unlicensed band.

FIG. 9 shows an example of interference in a frequency band adjacent to an unlicensed band.

In the unlicensed band, if a communication node performs a time division duplex (TDD) operation in any frequency band, DL/UL transmission caused by different communication nodes in an adjacent frequency band may be achieved at the same time and thus may act as great interference to each other.

For DL/UL duplexing of the communication node, it is required to have significantly sharp band-pass filtering performance to separate DL-UL interference. In addition, in order for the communication node to operate on various frequency resources in the unlicensed band, there is a need to perform the band-pass filtering for a plurality of center frequencies.

Figure 10:
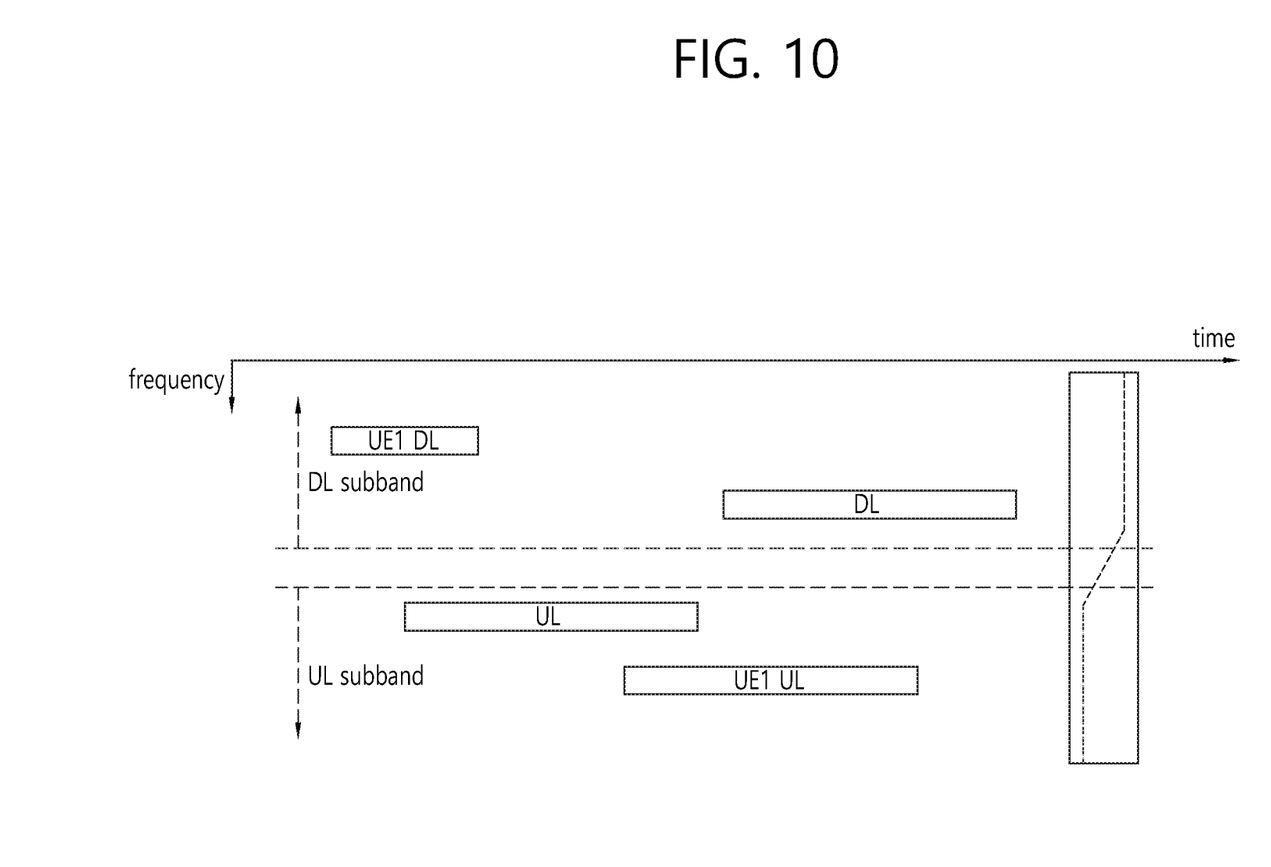
FIG. 10 shows an operation in the proposed unlicensed band.

FIG. 10 shows an operation in the proposed unlicensed band.

If the unlicensed band is divided into a DL subband and a UL subband, and if DL transmission or UL transmission is achieved in each subband, a requirement of frequency separation performance for duplexing may be mitigated. In addition, a center frequency of a duplexer used in the conventional frequency division duplex (FDD) operation may be reused.

In the unlicensed band, a first subband and a second subband may entirely or partially overlap in a full frequency band. A BS and a UE may both perform transmission in a frequency band allocated in an overlapping manner. In the unlicensed band, the BS and the UE may both be allocated to perform transmission in a frequency band allocated to the first subband, the second subband, and/or a guard band.

If a permission condition is satisfied also in the DL subband, signal transmission of the UE may be permitted. Alternatively, if the permission condition is satisfied also in the UL subband, signal transmission of the BS may be permitted. When a node in which transmission is not permitted in a corresponding subband is called an unpermitted node, the permission condition may include at least any one of the following conditions.

First, transmission may be permitted if transmit power required for transmission of a corresponding signal of the unpermitted node is less than or equal to a specific threshold. The threshold may be reported by the BS to the UE or may be shared between the BSs. In doing so, interference to another permitted node may be reduced when the unpermitted node transmits a signal with excessively great transmit power.

Second, transmission may be permitted if the unpermitted node is a receiver of the permitted node, and if a path loss between the unpermitted node and the permitted node or receive power (e.g., RSRP) is less than or equal to a specific threshold. The threshold may be reported by the BS to the UE or may be shared between the BSs.

Third, transmission may be permitted if an average interference power amount received by the unpermitted node or strength of a signal received by the unpermitted node from a neighboring permitted node is less than or equal to a specific threshold. In doing so, interference may be avoid by distinguishing a case where there is a high possibility that another unpermitted node adjacent to the unpermitted node is present or reception of the permitted node is interfered. The threshold may be reported by the BS to the UE or may be shared between the BSs.

Fourth, from a perspective of the communication node, a CCA threshold (i.e., a first threshold) in a subband in which the node is a permitted node (this is called a permitted subband) may be different from a CCA threshold (e.g., a second threshold) in a subband in which the node is an unpermitted node (this is called an unpermitted subband). The second threshold may be higher than the first threshold. The first and second thresholds may be reported by the BS to the UE or may be shared between the BSs. The communication node may not perform CCA in the permitted node (e.g., the first threshold=0), and may perform CCA in the unpermitted subband. Interference may be reduced by decreasing a possibility of transmission by the unpermitted node in a frequency band.

Whether a specific UE is capable of operating in a band in which DL/UL transmissions are both possible may be signaled by the UE to the network. Whether transmission/reception operations are both possible in the same frequency band may be signaled by the UE to the network. A UE capable of performing transmission/reception in the same frequency band may implement a sharp band-pass filter for each carrier in order to enable DL/UL duplexing for an adjacent carrier as shown in FIG. 8 with respect to all carriers in which transmission/reception are both possible in the unlicensed band.

A UE for implementing the sharp DL/UL band-pass filter for each carrier in the unlicensed band may perform transmission/reception in all carriers in the unlicensed band irrespective of a DL subband or a UL subband. Such capability may be signaled by the UE to the network.

In a subband within the unlicensed band, it may be defined as a band in which different types of communication nodes can perform transmission. For example, a first subband may be allocated to a type-A node, and a second subband may be allocated to a type-B node. The type-A node may include a UE, a BS, and/or a relay node. The type-B node may include a wireless node for communicating with the type-A node. Similarly to device-to-device (D2D) communication, when one wireless node performs one-to-one communication with another wireless node, the type-A node may refer to a wireless node which is a source of network synchronization or a wireless node which performs direction communication with the BS or the relay.

In the aforementioned embodiment, the unlicensed band may be configured in a state where the wireless device has access in the licensed band. Alternatively, the unlicensed band is a standalone band, and the aforementioned embodiment may be applied even if the wireless device operates only in the unlicensed band.

Figure 11:
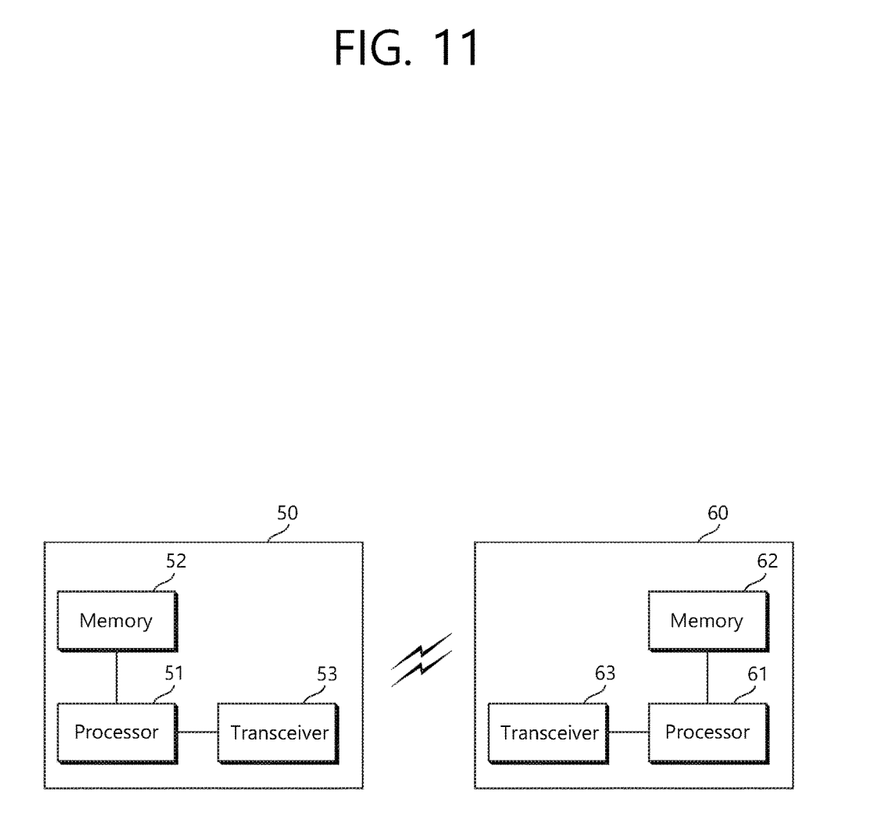
FIG. 11 is a block diagram showing a wireless communication system according to an embodiment of the present invention.

FIG. 11 is a block diagram showing a wireless communication system according to an embodiment of the present invention.

A wireless device 50 includes a processor 51, a memory 52, and a transceiver 53. The memory 52 is coupled to the processor 51, and stores various instructions executed by the processor 51. The transceiver 53 is coupled to the processor 51, and transmits and/or receives a radio signal. The processor 51 implements the proposed functions, procedures, and/or methods. In the aforementioned embodiment, an operation of the UE may be implemented by the processor 51. When the aforementioned embodiment is implemented with a software instruction, the instruction may be stored in the memory 52, and may be executed by the processor 51 to perform the aforementioned operation.

A BS 60 includes a processor 61, a memory 62, and a transceiver 63. The BS 60 may operate in an unlicensed band. The memory 62 is coupled to the processor 61, and stores various instructions executed by the processor 61. The transceiver 63 is coupled to the processor 61, and transmits and/or receives a radio signal. The processor 61 implements the proposed functions, procedures, and/or methods. In the aforementioned embodiment, an operation of the BS may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for communicating in a wireless communication system, the method performed by a wireless device and comprising:
    setting up a resource reservation period (RRP) which is a period during which channel access by the wireless device is not permitted in an unlicensed band; and performing channel access during the RRP if a permission condition is satisfied, wherein a first clear channel assessment (CCA) threshold in the unlicensed band during the RRP is greater than a second CCA threshold outside the RRP, wherein signals by other wireless devices are not transmitted during the RRP based on the first CCA threshold, wherein the channel access is not performed outside the RRP, and wherein signals by other wireless devices are transmitted outside the RRP based on the second CCA threshold.

2. The method of claim 1, wherein the permission condition comprises a required transmit power for transmission of the wireless device being less than or equal to a threshold.

3. The method of claim 1, wherein the permission condition comprises a receive power of the wireless device being less than or equal to a threshold.

4. The method of claim 1, wherein the permission condition comprises a strength of a signal received by the wireless device from a neighboring node being less than or equal to a threshold.

5. The method of claim 1, further comprising:
establishing a connection with a primary cell operating in a licensed band; and
activating a secondary cell operating in the unlicensed band according to an instruction from the primary cell.

6. An apparatus for communicating in a wireless communication system, the apparatus comprising:
a transceiver configured to transmit and receive a radio signal; and
a processor operatively coupled to the transceiver and configured to:
set up a resource reservation period (RRP) during which channel access by the apparatus is not permitted in an unlicensed band; and
control the transceiver to perform the channel access during the RRP if a permission condition is satisfied,
wherein a first clear channel assessment (CCA) threshold in the unlicensed band during the RRP is greater than a second CCA threshold outside the RRP,
wherein signals by other wireless devices are not transmitted during the RRP based on the first CCA threshold,
wherein the channel access is not performed outside the RRP, and
wherein signals by other wireless devices are transmitted outside the RRP based on the second CCA threshold.

7. The apparatus of claim 6, wherein the permission condition comprises a required transmit power for transmission of the apparatus being less than or equal to a threshold.

8. The apparatus of claim 6, wherein the permission condition comprises a receive power of the apparatus being less than or equal to a threshold.

9. The apparatus of claim 6, wherein the permission condition comprises a strength of a signal received by the apparatus from a neighboring node being less than or equal to a threshold.

10. The apparatus of claim 6, wherein the processor is further configured to:
establish a connection with a primary cell operating in a licensed band; and
activate a secondary cell operating in the unlicensed band according to an instruction from the primary cell.

* * * * *